United States Patent
Le

(10) Patent No.: US 7,043,851 B1
(45) Date of Patent: May 16, 2006

(54) ADJUSTABLE V-BLOCK

(76) Inventor: Michael Le, P.O. Box 9834, Canoga Park, CA (US) 91309

( * ) Notice: Subject to any disclaimer, the term of this patent is extended or adjusted under 35 U.S.C. 154(b) by 0 days.

(21) Appl. No.: 10/903,025

(22) Filed: Jul. 30, 2004

(51) Int. Cl.
  *G01B 5/20* (2006.01)
  *G01B 3/30* (2006.01)

(52) U.S. Cl. .................... 33/568; 33/550; 33/555.3; 33/567.1

(58) Field of Classification Search ............... 33/1 BB, 33/501.02, 543, 549, 550, 551, 555.1, 555.3, 33/567, 567.1, 568, 655
See application file for complete search history.

(56) References Cited

U.S. PATENT DOCUMENTS

| | | | | | |
|---|---|---|---|---|---|
| 833,598 | A | * | 10/1906 | Hansen | 33/567.1 |
| 1,489,747 | A | * | 4/1924 | Edrany | 33/567.1 |
| 2,330,412 | A | * | 9/1943 | Dierking | 33/567.1 |
| 2,471,684 | A | * | 5/1949 | Hastings | 33/567.1 |
| 2,518,080 | A | * | 8/1950 | Schury | 33/567.1 |
| 2,607,124 | A | * | 8/1952 | Dery | 33/567.1 |
| 2,694,861 | A | * | 11/1954 | Zelnick | 33/567.1 |
| 2,718,104 | A | * | 9/1955 | Kirklin | 33/567 |
| 2,807,881 | A | * | 10/1957 | Ozbilgic | 33/567.1 |
| 2,867,909 | A | * | 1/1959 | Keller | 33/567.1 |
| 3,247,598 | A | * | 4/1966 | Wilkes | 33/567.1 |
| 3,328,885 | A | * | 7/1967 | Frindel | 33/551 |
| 3,529,699 | A | * | 9/1970 | Smith | 33/567.1 |
| 3,638,323 | A | * | 2/1972 | Groe | 33/567.1 |
| 3,664,031 | A | * | 5/1972 | Duffy | 33/567.1 |
| 4,168,574 | A | * | 9/1979 | Chase | 33/567.1 |
| 5,113,591 | A | * | 5/1992 | Connelly | 33/550 |
| 6,085,430 | A | * | 7/2000 | Chen et al. | 33/550 |
| 6,390,937 | B1 | | 5/2002 | Marshall et al. | |
| 6,421,118 | B1 | | 7/2002 | Shaar | |

* cited by examiner

*Primary Examiner*—G. Bradley Bennett
(74) *Attorney, Agent, or Firm*—The Walker Law Firm; Allan Grant

(57) ABSTRACT

A mechanical support device for assisting individuals in setting up, creating, and verifying concentricity and roundness of a step cylindrical feature. The mechanical support device comprises a base and an adjustable section that is removably coupled to the base. The angle present in a groove located between the base and the adjustable section is designed to be either sixty, ninety, or one hundred twenty degrees. Items that are designed to be concentric with extremely low standards for variance would be placed flat within the groove and hand-rotated to check for any variance present. The mechanical support device can alternatively be used as a planer gage.

17 Claims, 4 Drawing Sheets

ADJUSTABLE V-BLOCK

I. BACKGROUND OF THE INVENTION

The present invention concerns that of a new and improved mechanical support device for assisting individuals in setting up, creating, and verifying concentricity and roundness of a step cylindrical feature.

II. DESCRIPTION OF THE PRIOR ART

There are a wide variety of products and processes already present that measure concentricity of various objects. One of these include U.S. Pat. No. 6,421,118, issued to Shaar, which provides a method of measuring concentricity of an optical fiber. Another one of these patents include U.S. Pat. No. 6,390,937, issued to Marshall et al., which provides a method for determining the concentricity of a golf ball having a barium or bismuth doped boundary layer or cover.

However, there are no processes or products that provide for an adjustable mechanical support device that can be used in setting up, creating, and verifying concentricity and roundness of a step cylindrical feature. The present invention provides this feature by allowing adjustability of the underlying support device.

III. SUMMARY OF THE INVENTION

The present invention concerns that of a new and improved mechanical support device for assisting individuals in setting up, creating, and verifying concentricity and roundness of a step cylindrical feature. The mechanical support device comprises a base and an adjustable section that is removably coupled to the base. The angle present in a groove located between the base and the adjustable section is designed to be either sixty, ninety, or one hundred twenty degrees. Items that are designed to be concentric with extremely low standards for variance would be placed flat within the groove and hand-rotated to check for any variance present. The mechanical support device can alternatively be used as a planer gage.

There has thus been outlined, rather broadly, the more important features of a mechanical support device that the detailed description thereof that follows may be better understood and in order that the present contribution to the art may be better appreciated. There are, of course, additional features of the mechanical support device that will be described hereinafter and which will form the subject matter of the claims appended hereto.

In this respect, before explaining at least one embodiment of the mechanical support device in detail, it is to be understood that the mechanical support device is not limited in its application to the details of construction and to the arrangements of the components set forth in the following description or illustrated in the drawings. The mechanical support device is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present mechanical support device. It is important, therefore, that the claims be regarded as including such equivalent constructions insofar as they do not depart from the spirit and scope of the present invention.

It is therefore an object of the present invention to provide a mechanical support device which has all of the advantages of the prior art and none of the disadvantages.

It is another object of the present invention to provide a mechanical support device which may be easily and efficiently manufactured and marketed.

It is another object of the present invention to provide a mechanical support device which is of durable and reliable construction.

It is yet another object of the present invention to provide a mechanical support device which is economically affordable and available for relevant purchasing government entities.

Other objects, features and advantages of the present invention will become more readily apparent from the following detailed description of the preferred embodiment when considered with the attached drawings and appended claims.

IV. BRIEF DESCRIPTION OF THE DRAWINGS

V. DESCRIPTION OF THE PREFERRED EMBODIMENT

Figure 1:
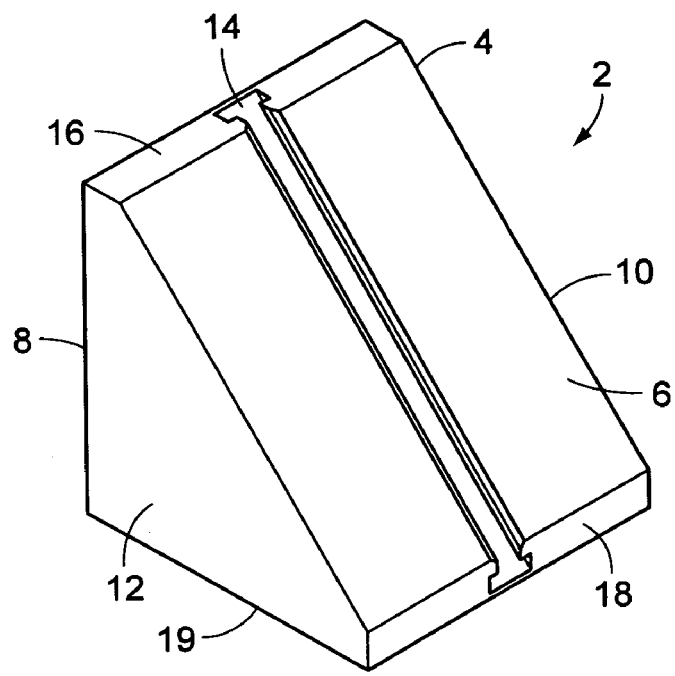
FIG. 1 is a perspective view of the base of the V-block.

FIG. 1 is a perspective view of the base 4 of the V-block 2. Base 4 has a triangular cross-sectional shape and has two side faces 10 and 12, an angled face 6, a top face 16, a front face 18, a rear face 8, and a bottom face 19. Rear face 8 and side faces 10 and 12 are perpendicular to a ground surface, while the bottom face 19 of the base 4 rests flat on the ground surface.

As seen in FIG. 1, the top face 16 is a narrow band that traverses from the side face 10 to side face 12, with top face 16 being flat and parallel to the ground surface. Front face 18 also is a narrow band that traverses from the side face 10 to side face 12, with front face 18 being flat and perpendicular to the ground surface.

Angled face 6, as seen in FIG. 1, travels from the top face 16 of the base 4 to the front face 18 of the base. Angled face 6 is shown to have a forty-five degree angle in FIG. 1, but this angle configuration could be modified as needed for various needed applications. Other possible angles that could be used for the angled face 6 are thirty degrees and sixty degrees.

Figure 2:
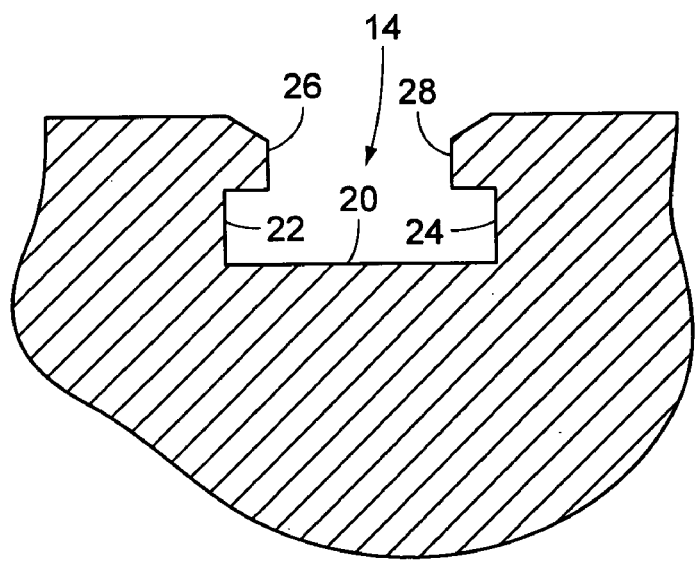
FIG. 2 is an end view of the groove located on the base of the V-block.

Base 4 also has a groove 14, which is shown in the perspective view in FIG. 1 and in an end view in FIG. 2. Groove 14 is primarily located on the angled face 6 of the base 4. Groove 14 has a bottom groove surface 20, two inner wall surfaces comprising a first inner wall surface 22 and a second inner wall surface 24, and a pair of protrusions comprising a first protrusion 26 and a second protrusion 28. Groove 14 itself has two ends, an upper end and a lower end.

As seen in FIG. 1, the upper end of the bottom groove surface 20 of the groove 14 starts very close to the intersection of the top face 16 and the rear face 8 of the base 4, while the lower end of the groove 14 starts very close to the intersection of the front face 18 and the bottom face 19 of the base 4.

The two inner wall surfaces are located immediately adjacent to the bottom groove surface 20 and are the area in which the groove 14 has the greatest internal width. The pair of protrusions are located closer to the angled face 6 of the base 4 and the area in between the pair of protrusions is smaller in width than the area in between the pair of inner wall surfaces.

The cross-sectional shape of the groove 14 is uniform throughout its entire length. Furthermore, the depth of the grove 14, as compared to the angled face 6, is uniform through the length of the groove 14.

Figure 3:
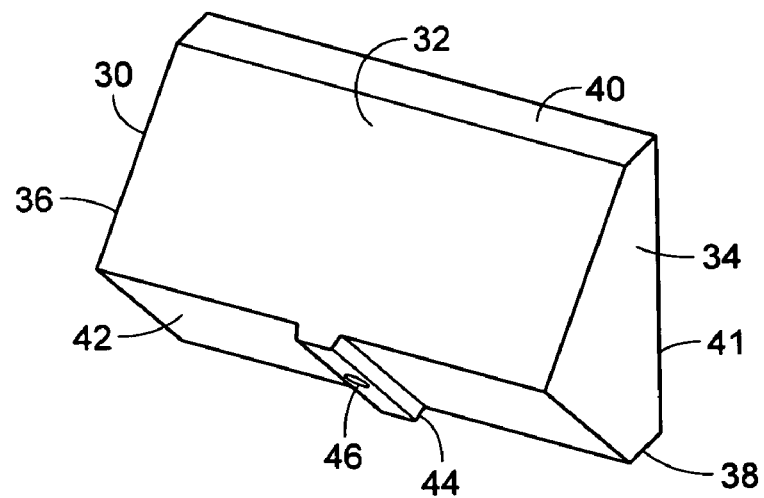
FIG. 3 is a bottom perspective view of the adjustable section of the adjustable section.
Figure 4:
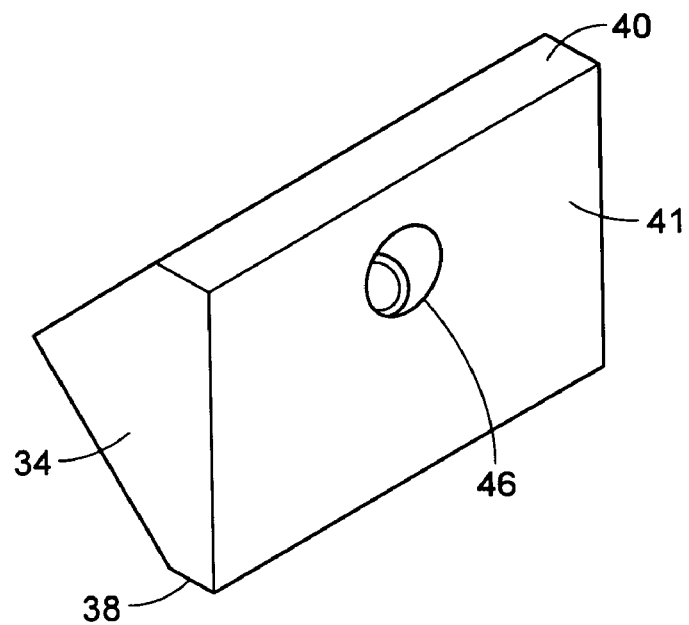
FIG. 4 is an upper perspective view of the adjustable section of the V-block.

FIG. 3 is a bottom perspective view of the adjustable section 30, while FIG. 4 is an upper perspective view of the adjustable section of the adjustable section 30. Adjustable section 30 has a rear face 32, two side faces comprising a right face 34 and a left face 36, a bottom face 42, a front face 41, a top face 40, a front angled face 38, and an extension 44. Extension 44 is located on the bottom face 42 of the adjustable section 30 and has two ends, a rear end and a front end, with the rear end of extension 44 starting at the rear face 32 of adjustable section 30 and the front end of extension 44 starting at the front face 41 of adjustable section 30.

Hole 46 is located within adjustable section 30 and has two ends, an upper end and a lower end. The lower end of hole 46 is located on the extension 44 about halfway between the front end and the rear end of the extension 44, while the upper end of the hole 46 is located on the front face 41 of the adjustable section 30.

When adjustable section 30 is couple with the base 4, the bottom face 42 of the adjustable section 30 is placed flat against the angled face 6 of the base 4. To properly effectuate this coupling, extension 44 is designed to fit snugly within the groove 14 of base 4. Extension 44 does not fit entirely within the groove 14, but rather, fits in the area in between the first protrusion 26 and the second protrusion 28. The area within the groove 14 in between the first inner wall surface 22 and the second inner wall surface 24 is not occupied by the extension. The actual width of the extension 44 is slightly less than the distance in between the first protrusion 26 and the second protrusion 28 to allow the adjustable section 30 to move up or down the angled face 6.

Figures 5, 6:
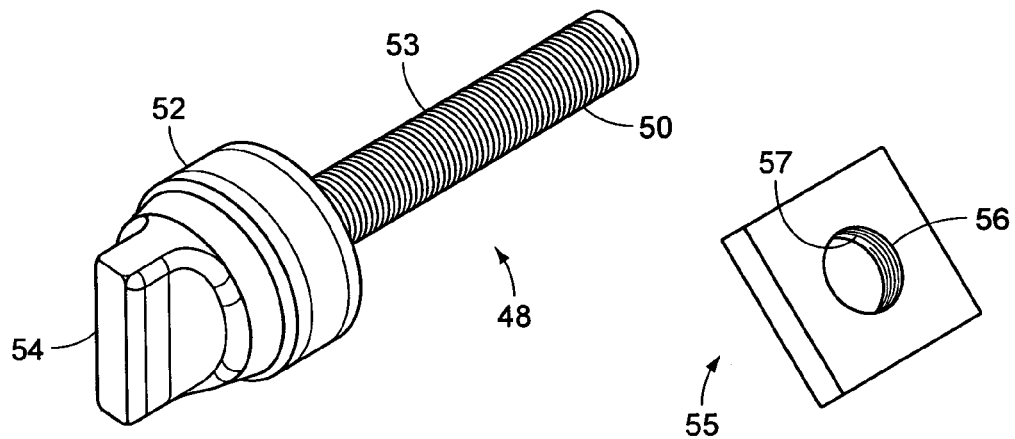
FIG. 5 shows a perspective representational view of a threaded bolt used to hold the base and the adjustable section together.
FIG. 6 shows a perspective representational view of a square nut that is coupled with the threaded bolt to hold the base and the adjustable section together.

FIG. 5 shows a perspective representational view of a threaded bolt 48 used to hold the base 4 and the adjustable section 30 together, while FIG. 6 shows a perspective representational view of a square nut 55 that is coupled with the threaded bolt 48 to hold the base 4 and the adjustable section 30 together. The threaded bolt 48 comprises a threaded rod 50 that has two ends, a free end and a handle end. The threaded rod 50 has a plurality of external threads 53 on it. To the handle end of the threaded rod 50 is attached a head 52 that also includes a handle 54 for easy maneuverability.

The square nut 55 has a central hole 56 that has internal threads 57. When the square nut 55 and the threaded bolt 48 are used to hold the base 4 and the adjustable section 30 together, the cross-sectional dimensions of the square nut 55 are small enough to allow the square nut 55 itself to snugly fit within the groove 14 of the base 4 in between the area of the first inner wall surface 22 and the second inner wall surface 24. The free end of the threaded rod 50 of the threaded bolt 48 is inserted through the upper end of the hole 46 and out the lower end of the hole 46, where it is threadably attached to the internal threads 57 within the hole 56 of square nut 55. To tighten the threaded bolt 48, an individual needs to merely turn the handle 54 on the head 52 of the threaded bolt 48, because there is not enough room within the groove 14 for the square nut 55 to freely rotate.

Figures 7, 8:
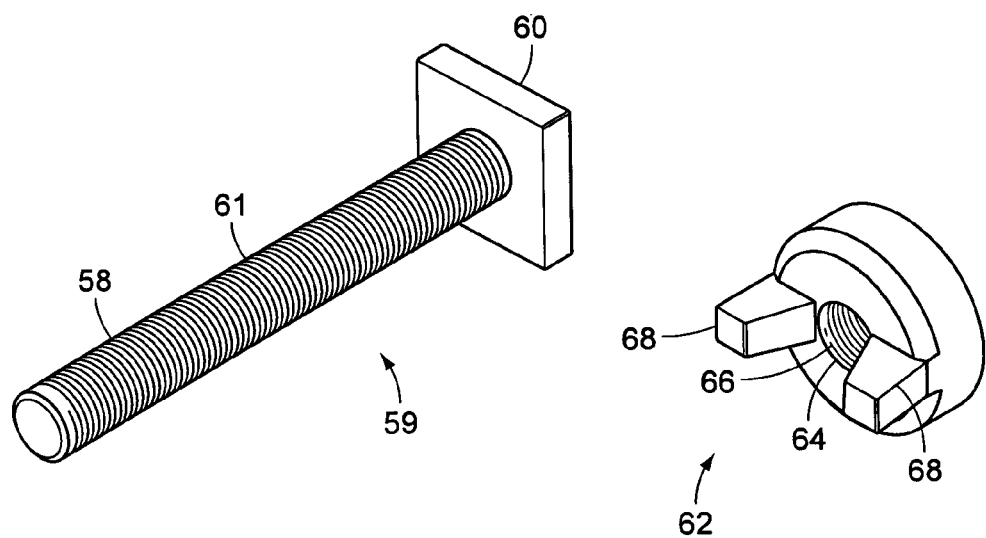
FIG. 7 shows a perspective representational view of a threaded screw used to hold the base and the adjustable section together.
FIG. 8 shows a perspective representational view of a wing nut that is coupled with the threaded bolt to hold the base and the adjustable section together.

FIG. 7 shows a perspective representational view of a threaded screw 59 used to hold the base 4 and the adjustable section 30 together, while FIG. 8 shows a perspective representational view of a wing nut 62 that is coupled with the threaded screw 59 to hold the base 4 and the adjustable section 30 together. The threaded screw 59 comprises a threaded rod 58 that has two ends, a free end and a handle end. The threaded rod 58 has a plurality of external threads 61 on it. To the handle end of the threaded rod 58 is attached a flat plate 60.

Wing nut 62 has two sides, a first side and a second side. The first side of wing nut 62 has a pair of handles 68. Wing nut 62 also has a central hole 64 with internal threads 66. The handles 68 allow the wing nut 62 to be applied to the free end of the threaded rod 58 of the threaded screw 59.

When the threaded screw 59 and the wing nut 62 are used to hold the base 4 and the adjustable section 30 together, the free end of the threaded rod 58 would first be inserted through the lower end of the hole 46 and on outward through the upper end of the hole 46, where the wing nut 62 could then be attached. Then, the plate 60 is placed into the groove 14 in the area within the groove 14 in between the first inner wall surface 22 and the second inner wall surface 24. To tighten the threaded screw 59, an individual needs to merely turn the handles 68 on the wing nut 62, which would be accessible through the upper end of the hole 46.

Figure 9:
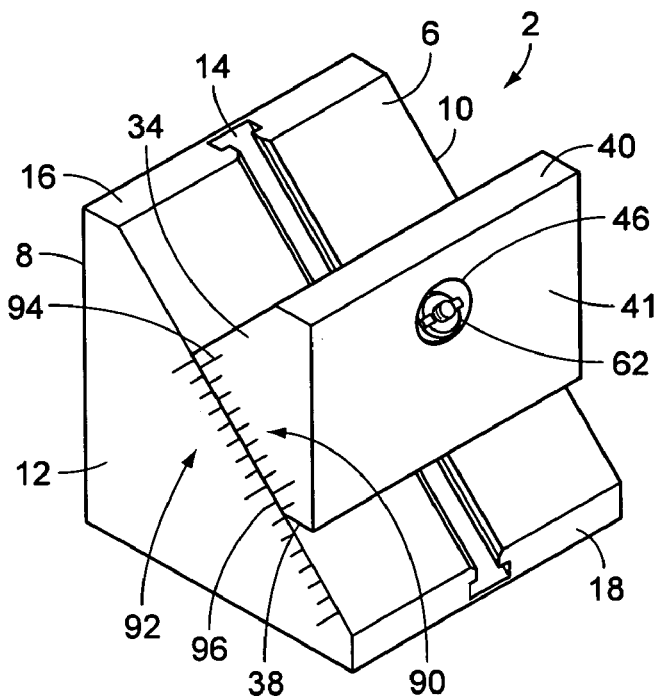
FIG. 9 shows a perspective view of the base and the adjustable section of the V-block as they are shown coupled to one another using a threaded screw and a wing nut.

FIG. 9 shows a perspective view of the base 4 and the adjustable section 30 of the V-block 2 as they are shown coupled to one another using a threaded screw 59 and a wing nut 62. Of course, this is only one representation of the possible methods used to attach the base 4 and the adjustable section 30 together, as there are other methods that could be used which may or may not be disclosed herein. The key items that are needed when analyzing whether the attachment between the base 4 and the adjustable section 30 are appropriate is whether the desired angle is correct and whether the bottom face 42 of the adjustable section 30 and the angled face 6 of the base 4 are flush with each other.

FIG. 9 also shows how the present invention can optionally possess a Vernier scale. The Vernier scale shown in FIG. 9 comprises a first measurement bar 90 located on right face 34 of adjustable section 30 and a second measurement bar 92 located on the side face 12 of base 4. The two measurement bars are designed to be flush against one another when placed on the parts of the present invention.

First measurement bar 90 comprises a plurality of markings 94, while second measurement bar 92 comprises a plurality of markings 96. The markings 94 and 96 do not match up exactly with one another, allowing the placement of adjustable section 30 with relation to the base 4 with great precision and detail, limited only by the precision of the combination of the two measurements bars 90 and 92.

Figure 10:
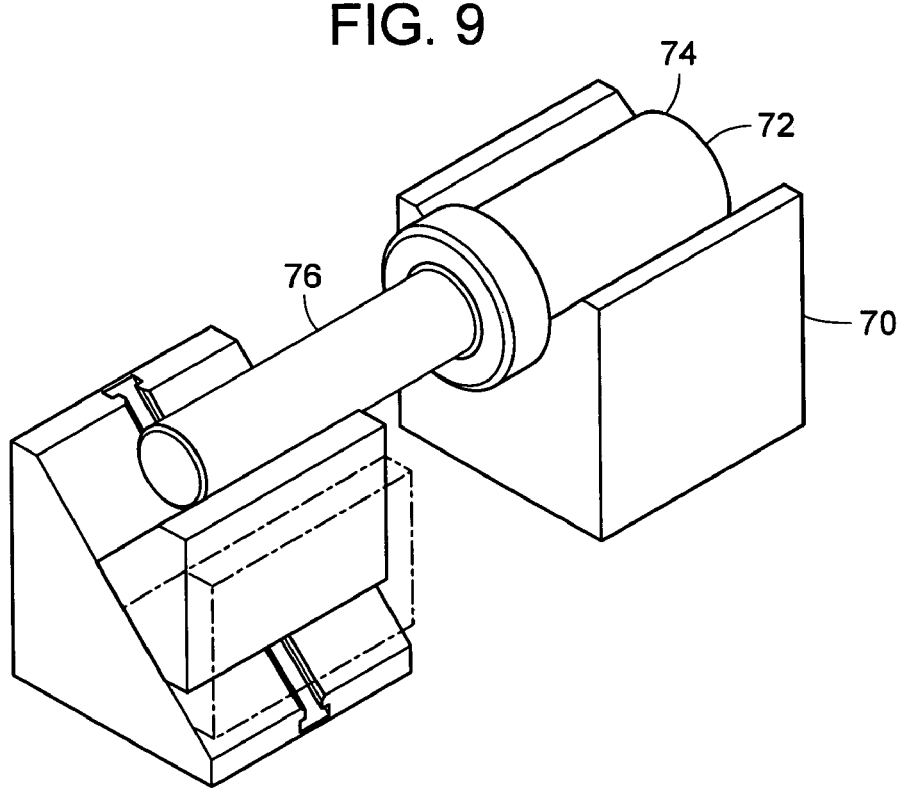
FIG. 10 shows a perspective view of the present invention as it would appear in use with a cylindrical object and an existing regular V-block.

FIG. 10 shows a perspective view of the present invention as it would appear in use with a cylindrical object 72. In this instance, a second V-block 70 is being used. Cylindrical object 72 has two ends, a first end 74 and a second end 76, with the first end 74 of the cylindrical object 72 having a larger diameter than the second end 76. In order to properly measure the concentricity of the second end 76 of the cylindrical object 72, the adjustable section 30 can be moved up or down until the outer surface of the second end 76 of the cylindrical object 72 rests flat within the groove created between base 4 and the adjustable section 30. The cylindrical object 72 can then be hand-rotated to check for concentricity and any imperfections that may be present.

Just like in FIG. 10, V-block 2 can be used essentially with any other V-block to create a matched set. This is ideal because it provides adjustability and versatility for the present invention.

The actual angle in between the base 4 and the adjustable section 30 can be made to be either sixty degrees or one-hundred twenty degrees in lieu of the ninety degrees actually being shown in the figures in this application. To accomplish, the angled face 6 of the base 4 would be thirty degrees or sixty degrees, respectively, with the rear face 32 of the adjustable section 30 having the same angle as the angled face 6 of the base 4. If the angled face 6 of the base 4 and the rear face 32 of the adjustable section 30 each had an angle of thirty degrees, the angle in between the base 4 and the adjustable section 30 would be sixty degrees. However, if the angled face 6 of the base 4 and the rear face 32 of the adjustable section 30 each had an angle of sixty degrees, the angle in between the base 4 and the adjustable section 30 would be one-hundred twenty degrees.

The present invention can also be used as a planer gage. FIG. 9 shows how the present invention would look while using it as a planar gage.

What I claim as my invention is:

1. A mechanical support device for assisting individuals in setting up, creating, and verifying concentricity and roundness of a step cylindrical feature, the mechanical support device comprising:
   an adjustable V-block having
   a. a base, the base having a triangular cross-sectional shape, the base having two side faces comprising a first side face and a second side face, the base further having an angled face, the base further having a top face, the base further having a front face, the base further having a rear face, the base further having a bottom face, the rear face and the two side faces being perpendicular to a ground surface, the bottom face resting flat on a ground surface, the top face being a narrow band that traverses from the first side face to the second side face, the top face being flat and parallel to the ground surface, the front face being a narrow band that traverses from the first side face to the second side face, the top face being flat and perpendicular to the ground surface, the angled face located in between the top face and the front face of the base,
   b. a groove located on the angled face of the base, the groove having two ends, an upper end and a lower end, the upper end of the groove located near the top face and the rear face of the base, the lower end of the groove located near the top face, front face, and bottom face of the base, the groove having a bottom groove surface and a pair of inner wall surfaces comprising a first inner wall surface and a second inner wall surface, the groove also having a pair of protrusions comprising a first protrusion and a second protrusion, the groove having a uniform depth in relation to the angled face of the base,
   c. an adjustable section having a rear face, the adjustable section also having a pair of side faces comprising a left face and a right face, the adjustable section also having a bottom face, the adjustable section also having a front face, the adjustable section also having a top face, the adjustable section also having a front angled face,
   d. an extension attached to the bottom face of the adjustable section, the extension having two ends, a front end and a rear end, the front end of the extension located near the front face of the adjustable section, the rear end of the extension located near the rear face of the adjustable section,
   e. a hole located in the adjustable section, the hole having two ends, an upper end and a lower end, the upper end of the hole located on the front face of the adjustable section, the lower end of the hole located on the extension about halfway between the front end and the rear end of the extension,
   f. means for securing the adjustable section to the base in a set position,
   g. wherein a portion of a cylindrical object is placed within the area in between the angled face of the base and the rear face of the adjustable section, and further wherein the cylindrical object can be slowly and meticulously rotated to observe the accuracy of the concentrical features of said cylindrical object.

2. A mechanical support device according to claim 1 wherein the hole located in the adjustable section is perpendicular to the bottom face of the adjustable section.

3. A mechanical support device according to claim 2 wherein the cross-sectional shape of the extension has the same configuration as the area within the groove located in between the first protrusion and the second protrusion, further wherein the actual width of the extension is slightly smaller than the distance between the first protrusion and the second protrusion.

4. A mechanical support device according to claim 3 wherein the means for securing the adjustable section to the base in a set position further comprises:
   a. a threaded bolt comprising a threaded rod having two ends, a free end and a handle end, the threaded rod having a plurality of external threads, the threaded bolt also having a handle attached to the handle end of the threaded bolt,
   b. a square nut having a central hole, the square nut also having a plurality of internal threads within the central hole,
   c. wherein the square nut is slid into the groove in the area in between the first inner wall surface and the second inner wall surface,
   d. further wherein the free end of the threaded rod of the threaded bolt is inserted through the upper end of the hole on the adjustable section and on through the lower end of the hole,
   e. further wherein the bottom face of the adjustable section is placed flush against the angled face of the base,
   f. further wherein the external threads on the free end of the threaded rod of the threaded bolt are threadably engaged with the internal threads on the hole on the square nut, g. further wherein the location of the adjustable section can be adjusted to a desired position in relation to the base, h. further wherein the location of the adjustable section can be temporarily set by tightening the handle on the threaded bolt.

5. A mechanical support device according to claim 3 wherein the means for securing the adjustable section to the base further comprises:

a. a threaded screw comprising a threaded rod having two ends, a free end and a handle end, the threaded rod having a plurality of external threads, the threaded screw also having a flat plate attached to the handle end of the threaded screw, b. a wing nut having two sides, a first side and a second side, the first side of the wing having a pair of handles, the wing nut having a central hole, the wing nut also having a plurality of internal threads within the central hole, c. wherein the fee end of the threaded screw of the threaded bolt is inserted through the lower end of the hole on the adjustable section and on through the upper end of the hole, d. further wherein the fiat plate of the threaded screw is slid into the groove in the area in between the first inner wall surface and the second inner wall surface, e. further wherein the bottom face of the adjustable section is placed flush against the angled face of the base, f. further wherein the external threads on the free end of the threaded rod of the threaded screw are threadably engaged with the internal threads on the central hole on the wing nut, g. further wherein the location of the adjustable section can be adjusted to a desired position in relation to the base, h. further wherein the location of the adjustable section can be temporarily set by tightening the wing nut.

6. A mechanical support device according to claim 3 wherein the angular measurement in between the rear face of the adjustable section and the angled face of the base is ninety degrees.

7. A mechanical support device according to claim 3 wherein the angular measurement in between the rear face of the adjustable section and the angled face of the base is sixty degrees.

8. A mechanical support device according to claim 3 wherein the angular measurement in between the rear face of the adjustable section and the angled face of the base is one hundred twenty degrees.

9. A mechanical support device for assisting individuals as a V-block and as a Planer Gage, the mechanical support device comprising:

a. a base, the base having a triangular cross-sectional shape, the base having two side faces comprising a first side face and a second side face, the base further having an angled face, the base further having a top face, the base further having a front face, the base further having a rear face, the base further having a bottom face, the rear face and the two side faces being perpendicular to a ground surface, the bottom face resting flat on a ground surface, the top face being a narrow band that traverses from the first side face to the second side face, the top face being flat and parallel to the ground surface, the front face being a narrow band that traverses from the first side face to the second side face, the top face being flat and perpendicular to the ground surface, the angled face located in between the top face and the front face of the base, b. a groove located on the angled face of the base, the groove having two ends, an upper end and a lower end, the upper end of the groove located near the top face and the rear face of the base, the lower end of the groove located near the top face, front face, and bottom face of the base, the groove having a bottom groove surface and a pair of inner wall surfaces comprising a first inner wall surface and a second inner wall surface, the groove also having a pair of protrusions comprising a first protrusion and a second protrusion, the groove having a uniform depth in relation to the angled face of the base, C. an adjustable section having a rear face, the adjustable section also having a pair of side faces comprising a left face and a right face, the adjustable section also having a bottom face, the adjustable section also having a front face, the adjustable section also having a top face, the adjustable section also having a front angled face, d. an extension attached to the bottom face of the adjustable section, the extension having two ends, a front end and a rear end, the front end of the extension located near the front face of the adjustable section, the rear end of the extension located near the rear face of the adjustable section, e. a hole located in the adjustable section, the hole having two ends, an upper end and a lower end, the upper end of the hole located on the front face of the adjustable section, the lower end of the hole located on the extension about halfway between the front end and the rear end of the extension, f. means for securing the adjustable section to the base in a set position, g. wherein the mechanical support device is as a Planer Gage; and h. wherein the mechanical support device is also an adjustable V-block.

10. A mechanical support device according to claim 9 wherein the hole located in the adjustable section is perpendicular to the bottom face of the adjustable section.

11. A mechanical support device according to claim 10 wherein the cross-sectional shape of the extension has the same configuration as the area within the groove located in between the first protrusion and the second protrusion, further wherein the actual width of the extension is slightly smaller than the distance between the first protrusion and the second protrusion.

12. A mechanical support device according to claim 11 wherein the means for securing the adjustable section to the base in a set position further comprises:

a. a threaded bolt comprising a threaded rod having two ends, a free end and a handle end, the threaded rod having a plurality of external threads, the threaded bolt also having a handle attached to the handle end of the threaded bolt, b. a square nut having a central hole, the square nut also having a plurality of internal threads within the central hole, C. wherein the square nut is slid into the groove in the area in between the first inner wall surface and the second inner wall surface, d. further wherein the free end of the threaded rod of the threaded bolt is inserted through the upper end of the hole on the adjustable section and on through the lower end of the hole, e. Her wherein the bottom face of the adjustable section is placed flush against the angled face of the base,
f. further wherein the external threads on the free end of the threaded rod of the threaded bolt are threadably engaged with the internal threads on the hole on the square nut,
g. further wherein the location of the adjustable section can be adjusted to a desired position in relation to the base,
h. further wherein the location of the adjustable section can be temporarily set by tightening the handle on the threaded bolt.

13. A mechanical support device according to claim 11 wherein the means for securing the adjustable section to the base further comprises:
   a. a treaded screw comprising a threaded rod having two ends, a free end and a handle end, the threaded rod having a plurality of external threads, the threaded screw also having a flat plate attached to the handle end of the threaded screw,
   b. a wing nut having two sides, a first side and a second side, the first side of the wing having a pair of handles, the wing nut having a central hole, the wing nut also having a plurality of internal threads within the central hole,
   C. wherein the free end of the threaded screw of the threaded bolt is inserted through the lower end of the hole on the adjustable section and on through the upper end of the hole,
   d. further wherein the flat plate of the threaded screw is slid into the groove in the area in between the first inner wall surface and the second inner wall surface,
   e. further wherein the bottom face of the adjustable section is placed flush against the angled face of the base,
   f. further wherein the external threads on the free end of the threaded rod of the threaded screw are threadably engaged with the internal threads on the central hole on the wing nut,
   g. further wherein the location of the adjustable section can be adjusted to a desired position in relation to the base,
   h. further wherein the location of the adjustable section can be temporarily set by tightening the wing nut.

14. A mechanical support device according to claim 11 wherein the angular measurement in between the rear face of the adjustable section and the angled face of the base is ninety degrees.

15. A mechanical support device according to claim 11 wherein the angular measurement in between the rear face of the adjustable section and the angled face of the base is sixty degrees.

16. A mechanical support device according to claim 11 wherein the angular measurement in between the rear face of the adjustable section and the angled face of the base is one hundred twenty degrees.

17. A method of using a mechanical support device comprises the steps of:
providing (a.) a base, the base having a triangular cross-sectional shape, the base having two side faces comprising a first side face and a second side face, the base further having an angled face, the base further having a top face, the base further having a front face, the base further having a rear face, the base further having a bottom face, the rear face and the two side faces being perpendicular to a ground surface, the bottom face resting flat on a ground surface, the top face being a narrow band that traverses from the first side face to the second side face, the top face being flat and parallel to the ground surface, the front face being a narrow band that traverses from the first side face to the second side face, the top face being flat and perpendicular to the ground surface, the angled face located in between the top face and the front face of the base, (b.) a groove located on the angled face of the base, the groove having two ends, an upper end and a lower end, the upper end of the groove located near the top face and the rear face of the base, the lower end of the groove located near the top face, front face, and bottom face of the base, the groove having a bottom groove surface and a pair of inner wall surfaces comprising a first inner wall surface and a second inner wall surface, the groove also having a pair of protrusions comprising a first protrusion and a second protrusion, the groove having a uniform depth in relation to the angled face of the base, (c.) an adjustable section having a rear face, the adjustable section also having a pair of side faces comprising a left face and a right face, the adjustable section also having a bottom face, the adjustable section also having a front face, the adjustable section also having a top face, the adjustable section also having a front angled face, (d.) an extension attached to the bottom face of the adjustable section, the extension having two ends, a front end and a rear end, the front end of the extension located near the front face of the adjustable section, the rear end of the extension located near the rear face of the adjustable section, (e.) a hole located in the adjustable section, the hole having two ends, an upper end and a lower end, the upper end of the hole located on the front face of the adjustable section, the lower end of the hole located on the extension about halfway between the front end and the rear end of the extension, and (f.) means for securing the adjustable section to the base in a set position;
wherein the mechanical support device is as a Planer Gage;
wherein the mechanical support device is also a V-block;
wherein said V-block is adjustable, and said V-block has the ability to move the adjustable section up or down to match an existing V-block; further where a cylindrical object has a larger diameter on one end and a small diameter on the other end, a user can utilize one or more adjustable V-blocks to create a flat surface for accurate measuring.

\* \* \* \* \*